A. WULFF.
ROLLER BEARING WHEEL.
APPLICATION FILED JAN. 25, 1909.

940,106.

Patented Nov. 16, 1909.

Attest:
H. G. Sweet.
C. G. Moore.

Inventor:
August Wulff.
By Hedwer, Atty.

UNITED STATES PATENT OFFICE.

AUGUST WULFF, OF CEDAR FALLS, IOWA, ASSIGNOR TO WAGNER MANUFACTURING COMPANY, OF CEDAR FALLS, IOWA, A CORPORATION OF IOWA.

ROLLER-BEARING WHEEL.

940,106.

Specification of Letters Patent.   Patented Nov. 16, 1909.

Application filed January 25, 1909.  Serial No. 474,174.

*To all whom it may concern:*

Be it known that I, AUGUST WULFF, a citizen of the United States of America, and resident of Cedar Falls, Blackhawk county, Iowa, have invented a new and useful Roller-Bearing Wheel, of which the following is a specification.

The object of this invention is to provide an improved construction for pulleys or wheels.

A further object of this invention is to provide an improved construction for two-piece wheels made of sheet metal by stamping.

A further object of this invention is to provide an improved construction for the side plates of a wheel, a bushing therefor, connection between the bushing and side plates and rollers within the bushing to provide a bearing on a journal or shaft.

My invention consists in the construction, arrangement and combination of elements hereinafter set forth, pointed out in my claims and illustrated by the accompanying drawing, in which—

Figure 1:
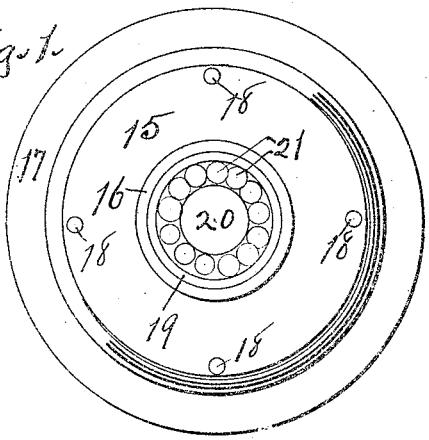
Figure 2:
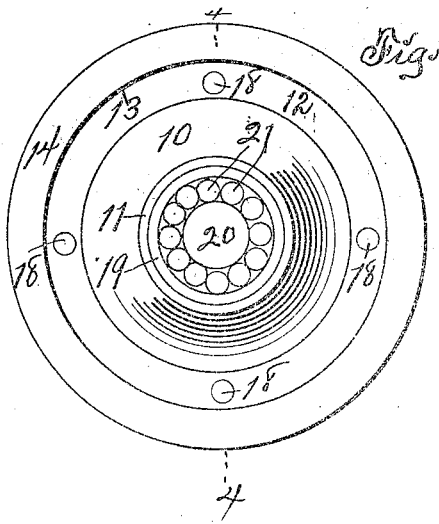
Figure 3:
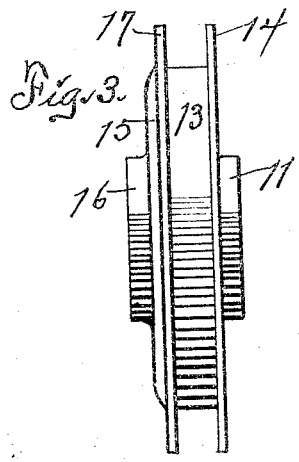
Figure 4:
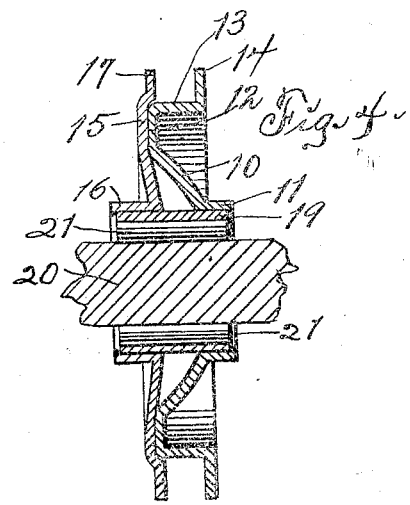

Figure 1 is a side view of the complete wheel in position on a journal or shaft with rollers interposed between the wheel and shaft. Fig. 2 is an opposite side view of the same. Fig. 3 is an edge view of the wheel. Fig. 4 is a cross-section on the indicated line 4—4 of Fig. 2.

In the construction of the wheel as shown the numeral 10 designates a side plate of concavo-convex form and provided with a hub 11 at its center formed by stamping or drawing the central portion of the material of the plate to one side into annular form. The hub 11 projects from the convex side of the plate 10. A flat web or ring 12 is formed on the periphery of the plate 10 and is at right angles to the axis of the plate and hub 11. A rim 13 is formed on the periphery of the ring or web 12 and extends laterally therefrom across the plate at right angles to the ring and concentric with the hub 11. A flange 14 is formed on and at right angles to and radially of the rim 13. A plate 15 is provided and is of slightly concavo-convex form. The plate 15 is provided with a hub 16 formed by stamping or drawing the central portion of the material of said plate to one side into annular form. The hub 16 projects from the concaved face of the plate 15. A flange 17 is formed on the periphery of the plate 15 at right angles to the axis of said plate and of the hub 16 and is offset slightly from the convex side of the plate into a plane closer to and parallel with the flange 14. The plate 15 is of such diameter relative to the diameter of the ring or web 12 that the offset at the juncture of the plate and flange 17 overlies the angle at the juncture of the ring and rim 13 and forms a tight joint therewith, thus avoiding a seam in the center as is common to two-piece pulleys or wheels. The ring 12 is connected to the peripheral portion of the plate 15 by rivets 18. A bushing 19 is mounted tightly in the hubs 11 and 16 and is slightly shorter than the extreme length of said hubs. The ends of the hubs 11 and 16 are shrunk or clenched slightly on the ends of the bushing 19 to retain said bushing in the hubs under all circumstances. The wheel, constructed of the plates and bushing as described is mounted loosely on a shaft 20 and rollers 21 are interposed between the bushing and the shaft to form a roller bearing between the wheel and shaft.

The wheel above described is designed for use with door-hangers and tracks; but I am not limited in its use in this particular.

I claim as my invention—

1. A wheel composed of side plates, means for connecting said plates, one plate formed with a rim, said rim formed with a flange, the opposite plate formed with an offset overlying the juncture of the first plate and rim, the latter plate also formed with a flange peripherally of the offset therein, and a bushing rigidly mounted centrally of said plates.

2. A wheel composed of side plates, means for connecting said plates, means for mounting said plates for rotation, one plate formed with a rim, said rim formed with a flange, the opposite plate formed with an offset overlying the juncture of the first plate and rim, the latter plate also formed with a flange peripherally of the offset therein.

3. A wheel composed of side plates, one of said plates concavo-convex and formed with a hub, said plate also formed with a circumferential ring, said ring formed with a circumferential rim extending laterally therefrom and said rim formed with a circumferential flange, the other plate concavo-convex to less degree and formed with a hub, the latter plate also formed with a flange offset from and circumferentially thereof, the offset at the juncture of the latter flange and plate overlying the juncture of the ring and rim of the first plate, a bushing within the hubs and means for connecting said plates.

4. A wheel composed of side plates, one of said plates concavo-convex and formed with a hub, said plate also formed with a circumferential ring, said ring formed with a circumferential rim extending laterally therefrom across the plate, said rim formed with a circumferential flange, the other plate concavo-convex to less degree and formed with a hub and a flange offset from and circumferentially thereof, the offset at the juncture of the latter flange and plate overlying the juncture of the ring and rim of the first plate, a bushing within the hubs, the ends of the hubs clenched on the ends of the bushing, a shaft within the bushing, and rollers interposed between said bushing and shaft.

Signed by me at Cedar Falls, Iowa, this twenty second day of August, 1908.

AUGUST WULFF.

Witnesses:
W. L. MARCH,
W. R. IRWIN.